US006558497B2

(12) United States Patent
Franco et al.

(10) Patent No.: US 6,558,497 B2
(45) Date of Patent: May 6, 2003

(54) THERMOPLASTIC SLATS FOR BLINDS AND THE MANUFACTURING THEREOF

(76) Inventors: Marco-Carmine Franco, 12315 de Poutrincourt, Montreal, Quebec (CA), H3M 3E7; Sandro Franco, 12315 de Poutrincourt, Montreal, Quebec (CA), H3M 3E7

( * ) Notice: Subject to any disclaimer, the term of this patent is extended or adjusted under 35 U.S.C. 154(b) by 0 days.

(21) Appl. No.: 09/829,005

(22) Filed: Apr. 10, 2001

(65) Prior Publication Data

US 2001/0042345 A1 Nov. 22, 2001

(30) Foreign Application Priority Data

Apr. 10, 2000 (CA) ........................................ 2304909

(51) Int. Cl.$^{7}$ ........................ B44C 1/165; B32B 31/20; B41M 3/12; B29C 59/04; E06B 9/386

(52) U.S. Cl. ...................... 156/230; 156/196; 156/238; 156/240; 156/247; 156/277; 156/289; 156/244.11; 427/148; 427/210; 427/355; 428/42.1; 428/207; 428/914; 264/129; 264/132; 264/177.17; 264/220

(58) Field of Search ................................ 156/196, 230, 156/231, 232, 234, 235, 236, 237, 238, 239, 240, 241, 242, 240.11, 240.16, 244.1, 247, 277, 280, 540, 250, 580, 582, 583.1; 427/146, 147, 148, 209, 210, 211, 355, 335, 359, 372.2; 428/42.1, 195, 200, 201, 207, 303, 307, 914; 264/129, 340, 118, 132, 171.1, 171.21, 110, 40.2, 284, 177.17, 176.1, 213, 220, 299

(56) References Cited

U.S. PATENT DOCUMENTS

| | | | | | |
|---|---|---|---|---|---|
| 2,392,594 | A | * | 1/1946 | Karfiol et al. | 428/161 |
| 2,559,649 | A | * | 7/1951 | Little et al. | 156/231 |
| 3,010,861 | A | * | 11/1961 | Reese | 156/199 |
| 3,892,078 | A | * | 7/1975 | Closson, Jr. | 156/244.11 |
| 4,312,686 | A | * | 1/1982 | Smith et al. | 156/209 |
| 4,462,852 | A | * | 7/1984 | Custor | 156/231 |
| 4,495,014 | A | * | 1/1985 | Gebrian et al. | 156/80 |
| 5,281,290 | A | * | 1/1994 | Bosler | 156/230 |
| 5,506,031 | A | * | 4/1996 | Spain et al. | 428/172 |
| 5,512,126 | A | * | 4/1996 | Kannabiran et al. | 156/380.9 |
| 6,183,671 | B1 | * | 2/2001 | Stauffacher et al. | 264/40.1 |

FOREIGN PATENT DOCUMENTS

| | | | | |
|---|---|---|---|---|
| JP | 56-53025 | * | 5/1981 | B29C/23/00 |
| JP | 05-24166 | * | 2/1993 | B32B/31/30 |

* cited by examiner

*Primary Examiner*—J. A. Lorengo
(74) *Attorney, Agent, or Firm*—Robert Mitchell; Ogilvy Renault

(57) ABSTRACT

A method of applying a decorative color to a thermoplastic strip suited for use to produce slats for blinds is characterized by the use of a heat sensitive printing paper of the type normally used to color the fabric material from which valances are generally made. By using that type of color transferring medium to color the thermoplastic slats it becomes possible, for instance, to manufacture blind slats having the same color as the fabric valance to be hung decoratively from the window for which the blind is to be installed. There is also disclosed a blind structure for attenuating the flapping noise produced when the slats enter in contact with each other.

9 Claims, 4 Drawing Sheets

THERMOPLASTIC SLATS FOR BLINDS AND THE MANUFACTURING THEREOF

BACKGROUND OF THE INVENTION

1. Field of the Invention

The present invention relates to blinds, more particularly, to decorative slats for blinds.

2. Description of the Prior Art

It is known to manufacture extruded thermoplastic products, such as blind slats, in a variety of colors. In the case of thermoplastic slats, a film coated with heat transferable colorant is typically used to apply a decorative color onto the slats. This is accomplished by drawing the film under tension into a press where the film is forced against the thermoplastic slat material at an elevated temperature so as to cause the colorant to be transferred from the film to the thermoplastic slat material.

When color is applied on fabric materials (used to manufacture curtains, valance or the like), a heat sensitive printing paper is used, via a stamping process, rather than the above-mentioned coated film used for thermoplastic blind slats. This difference in color transfer media results in the incapacity of obtaining exactly the same color for the thermoplastic blind and the associated fabric valance. Thus, fabrics have been applied to slats of blinds to ensure color match between the blinds and the valance.

Therefore, there is a need for a new color transfer process which allows for the production of thermoplastic blind slats having exactly the same color as the associated fabric valance.

SUMMARY OF THE INVENTION

It is therefore an aim of the present invention to provide a novel method of applying a decorative color to a thermoplastic substrate.

It is also an aim of the present invention to provide such a method which renders possible the production of thermoplastic and fabric products having improved color matching.

It is a further aim of the present invention to reduce the noise generally produced when a plurality of interconnected blind slats enter in contact with each other.

Therefore, in accordance with the present invention, there is provided a method of reproducing the color of a given fabric product on a thermoplastic substrate, comprising the steps of: providing a color transfer medium of a same type as the one used for coloring the fabric product, said color transfer medium including a continuous web of heat sensitive printing paper having a colorant thereon corresponding to the color of the fabric product; providing a pair of lamination rollers defining a nip therebetween; advancing a continuous thermoplastic substrate and said continuous web of heat sensitive printing paper through said nip to press said heat sensitive printing paper against a first surface of said thermoplastic substrate at a sufficient elevated temperature to cause transfer of said colorant from said heat sensitive printing paper to said thermoplastic substrate, wherein said web of heat sensitive printing paper supplied to said nip has only a slight tension therein; and separating said thermoplastic substrate from said web of heat sensitive printing paper In accordance with a further general aspect of the present invention, there is provided a blind comprising a succession of slats, each said slat comprising a structural strip and a layer of soft material applied at a location thereon to act as a damper to reduce the noise resulting from collisions between adjacent ones of said slats.

In accordance with a further general aspect of the present invention, there is provided a blind slat comprising a structural base layer, a decorative layer applied on one side of said structural layer, and a pair of lateral lips secured on said decorative layer so as to extend over opposed longitudinal sides thereof.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
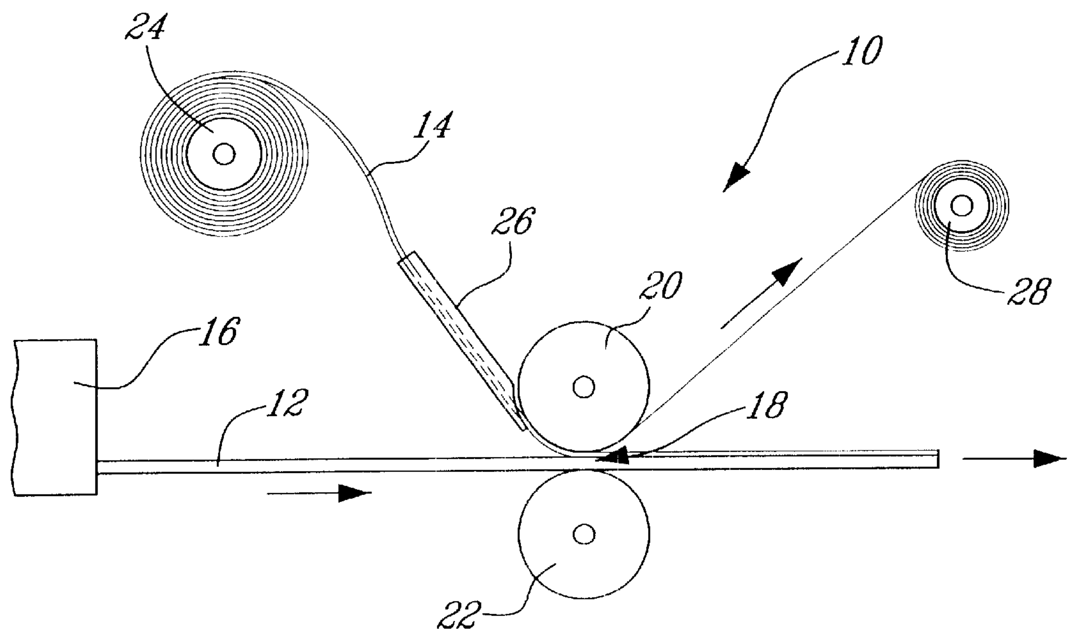
FIG. 1 is a schematic elevational side view of a thermal transfer printing apparatus used in accordance with a first embodiment of the present invention to produce colored blinds.

FIG. 1 illustrates a thermal transfer printing apparatus 10 which can be used to apply a desired color, such as the color of a decorative fabric material, to a thermoplastic product, such as an extruded substrate or strip 12, made for instance of PVC, used to make window-blind slats.

It has been found that by using a roll of heat sensitive printing paper 14 of the type used for applying a color to a fabric material rather than using the conventional coated film, it is possible to manufacture blind slats having exactly the same color as the fabric valance, draperies or the like to be hung decoratively from the window in which the blind is to be installed.

As seen in FIG. 1, the extruded PVC strip 12 is continuously supplied from a die 16 through a nip 18 defined between a pair of power-driven lamination rollers 20 and 22. The rollers are set so as to exert a pressure of approximately 100 lbs. on the strip 12'. The extruded PVC strip 12 is advanced through the apparatus 10 at approximately 30 ft/min and is supplied at about 350° F. The advancing speed of the paper 14 and the strip 12 must be at least equal to 10 ft/min to prevent the paper 14 from burning. It is pointed out that the advancing speed of the strip 12 and of the printing paper 14 could be more than 30 ft/min. The heat sensitive printing paper 14 is wound on a motorized supply spool 24 and is delivered and guided between the lamination rollers 20 and 22 by an appropriate guiding structure schematically illustrated at 26 in FIG. 1. The angle of incidence of the printing paper 14 at the rollers 20 and 22 is preferably about 45 degrees. However, this angle can be comprised in a range from about 20 degrees to about 70 degrees.

Figure 3:
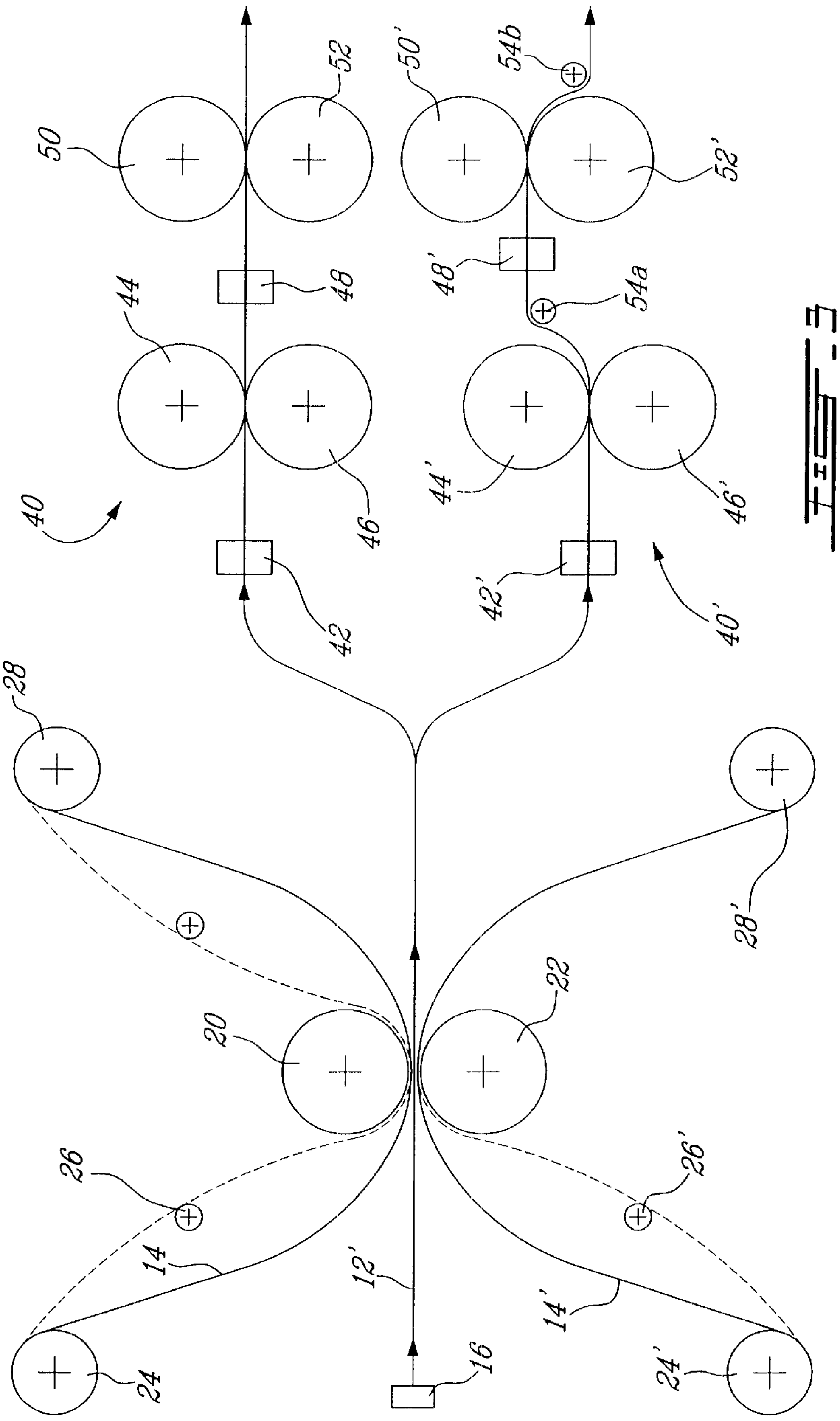
FIG. 3 is a diagram illustrating an embossing process in accordance with an embodiment of the present invention.

As represented in broken lines in FIG. 3, the guiding structure 26 is preferably adjustable for allowing the angle of incidence of the printing paper 14 to be varied as required or desired.

As opposed to conventional coated film used to apply a decorative color to an extruded thermoplastic product, it has been found that there must be virtually zero tension in the heat sensitive paper 14 between the supply spool 24 and the lamination rollers 20 and 22 (i.e. upstream of the nip 18) in order to effectively and efficiently color the extruded PVC strip 12. This can be accomplished, for instance, by driving and continuously adjusting the unwinding speed of the supply spool 24 so as to compensate the pulling action exerted by the lamination rollers 20 and 22 on the heat sensitive paper 14. Before being installed in the apparatus 10, the paper 14 is precisely cut so as to have a width which is slightly greater than that of the PVC strip 12. For instance, if the strip 12 has a 3½" width, the width of the paper 14 would be 4". This ensures proper application of the paper 14 onto the strip 12.

The heat sensitive paper 14, which is at the ambient temperature, is advanced through the apparatus 10 at the same speed as that of the extruded PVC strip 12. At the nip 18, the heat sensitive paper 14 is pressed against a top surface of the extruded PVC strip 12 at a sufficiently elevated temperature to cause the colorant present on the paper 14 to migrate to the extruded PVC strip 12. The lamination rollers 20 and 22 are maintained between approximately 275° F. and 350° F. during the color transfer process.

At their exit from, i.e. downstream of, the nip 18, the colored extruded PVC strip 12 and the heat sensitive printing paper 14 are separated. A take-up spool 28 is thus provided downstream of the lamination rollers 20 and 22 to receive the continuous web of used printing paper 14. In FIG. 1, a slight tension is induced in the paper 14 between the lamination rollers 20 and 22 and the take-up spool 28.

As seen in FIG. 3, it is contemplated to provide a second roll of printing paper 14' upstream of the lamination rollers 20 and 22 and underneath a strip 12' to provide for the coloration of the under surface thereof. It is understood that a second guiding structure 26' and a second take up spool 28' would also be provided. This arrangement would allow a decorative color to be simultaneously applied on both sides of the extruded strip 12'. Obviously, the roll of printing papers 14 and 14' could be of a different colors, if desired.

FIG. **2*a* illustrates a transversally curved blind slat 30 formed of a substantially rigid PVC structural strip 32 having a front surface lined with a coextensive decorative flexible or resilient PVC strip 34. The structural strip 32 and the resilient PVC strip 34 are preferably co-extruded. The opposed longitudinal sides of the resilient PVC strip 34 are folded over against the opposed longitudinal sides of a rear surface 36 of the structural strip 32 to act as dampers to reduce the noise resulting from collisions between the slats 30** of a blind.

The blind slat 30 is typically formed by a co-extrusion process and the strips 32 and 34 are assembled together in a unitary structure by a fusion process.

FIGS. **2*b* to 2*m* illustrate various other configurations of the resilient or soft layer of PVC material 34 and of the rigid PVC structural strip 32** to also provide a noise dampening effect.

Figure 2A:
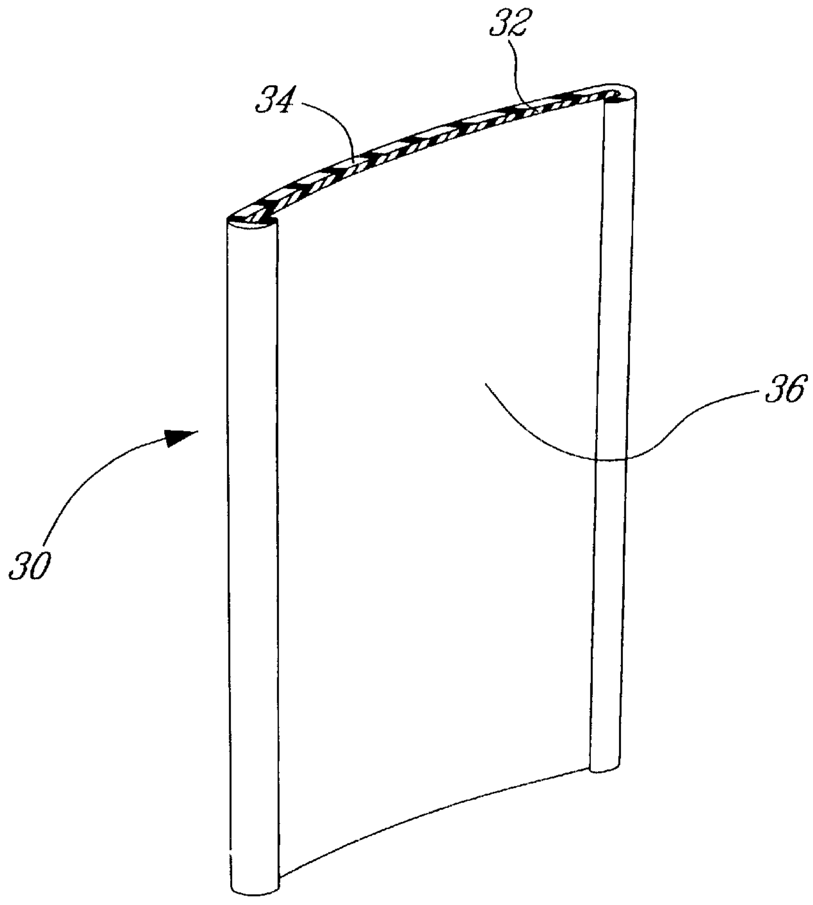
FIG. 2*a* is a rear perspective view of a portion of a blind slat manufactured in accordance with a second embodiment of the present invention.
Figure 2B:
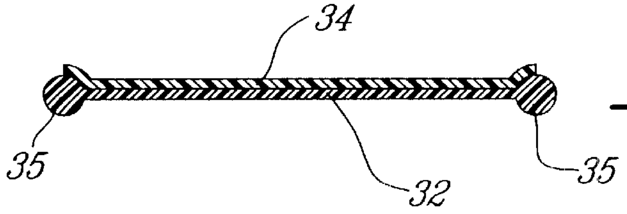
FIGS. 2*b* to 2*m* illustrate, in cross-section, various configurations of multi-layered blind slats.
Figure 2C:
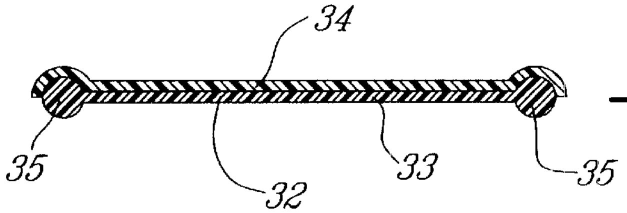
Figure 2D:
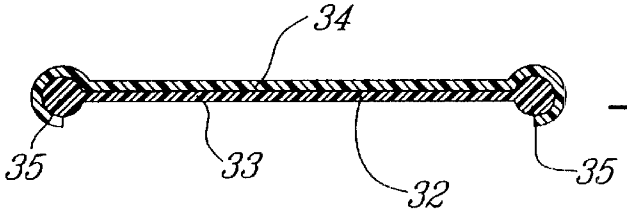
Figure 2E:
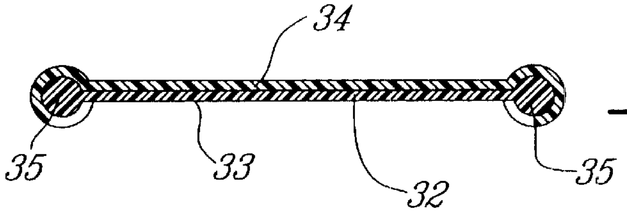
Figure 2F:
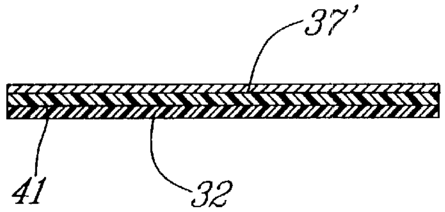
Figure 2G:
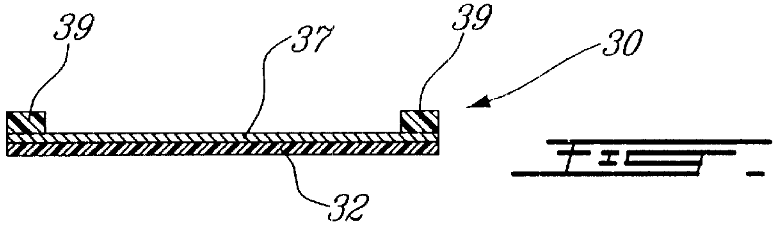
Figure 2H:
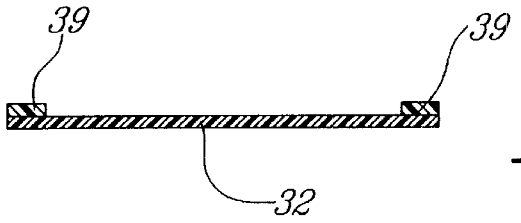
Figure 2I:
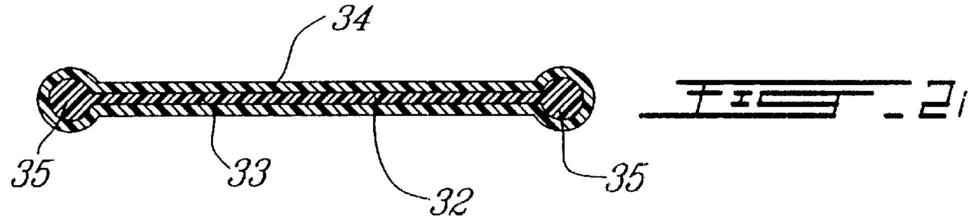

As shown in FIGS. **2*b* to 2*e*, the structural strip 32 can have a flat central portion 33 merging into two longitudinally extending rounded side portions 35. The flexible layer 34 can extend over one side of the central flat portion 33 and about ¼, ½, ¾ or even over the full circumference of the rounded side portions 35. Alternatively, as illustrated in FIG. 2*i*, the structural strip 32 can be completely surrounded or covered by the soft or flexible layer 34**.

The dampers could alternatively be formed through a triple extrusion process wherein in addition to the structural strip 32 and to an overlying decorative layer 37, a pair of narrow resilient PVC strips or clear lateral lips 39 are extruded along the opposed longitudinal side edges of the blind slat 30, for instance, on the decorative strip 37, as illustrated in FIG. **2*g***. The triple extrusion can be done either with two subsequent dies or all with one triple extrusion die.

In addition to providing noise attenuation, the narrow resilient strips 39 provide the impression that the decorative strip 37 is held within a channel formed on a front surface of the slat 30, thereby reproducing the look of a channeled blind slat of the type having an elongated strip of fabric material held on front side thereof. To this end, the decorative layer is preferably textured to better emulate the appearance of a fabric tissue. As will be explained hereinbelow, such a textural effect can be provided by embossing or engraving a desired pattern on the decorative strip 37 and the structural strip 32.

It is noted that the opaqueness of the dampening lips or resilient strips 39 can be modified to obtain different levels of translucency.

Alternatively, as illustrated in FIG. **2*f*, one side of the structural strip 32 can be co-extruded so as to be completely covered with a soft layer of material 41 which can, in turn, be covered by a decorative layer 37'**.

As shown in FIG. **2*h*, the soft lateral lips 39 can be directly co-extruded along the sides of the hard structural strip 32**.

Figure 2J:
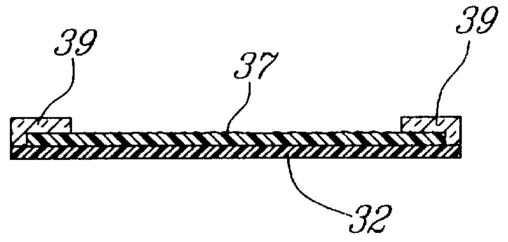
Figure 2K:
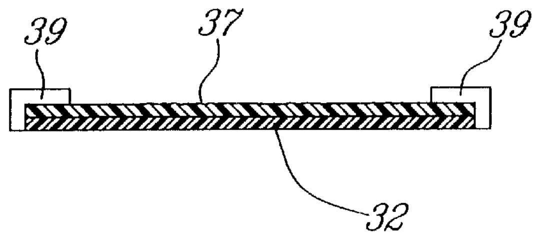
Figure 2L:
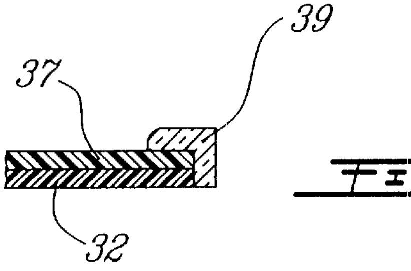
Figure 2M:
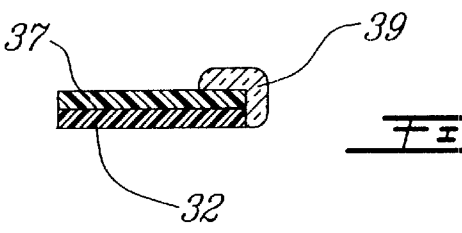

As shown in FIGS. **2*j* and 2*k*, the soft translucent lips 39 can be extruded so as to have an L-shaped cross-section in order to cover the lateral edges of the flexible PVC decorative layer 37 and of the rigid structural strips 32 (see FIG. 2*k*) or, alternatively, only the lateral edges of the decorative layer 37 (see FIG. 2*j***).

As shown in FIGS. **2*l* and 2*m* all or some of the edges of the soft lips 39** can be rounded to vary the noise attenuation characteristics thereof.

In summary, the slats 30 can be made substantially silent by three different methods: 1) one side thereof may be co-extruded with a material so as to be completely covered by a softer material, 2) a small section on each of the slat (approximately ¼ inch) may be co-extruded with a soft material, or 3) a co-extruded rigid structural core can be covered by a co-extruded soft covering layer all over the surface of the slat.

As discussed hereinbefore, the noise dampening effect can be obtained with different configuration of the soft lips 39. The soft lips 39 can be partially co-extruded either on the top soft layer, top and middle layers or wrapped around the edges of the slat.

As seen in FIG. 3, once the color has been transferred onto the strip 12', the latter is directed in a continuous way to one of first and second embossing stations 40 and 40'.

The first embossing station 40 includes a first heater 42 for heating the strip 12' from above before the same is pressed between a top embossing roller 44 and a bottom roller 46. Cooling of the strip 12' after the color transferring process requires re-heating of the strip 12' for subsequent embossing. The heater 42 allows to soften the top surface of the PVC strip 12' in preparation for the subsequent top embossing operation. The embossing or textured roller 44 is provided on its circumference with a given embossing pattern to emboss or engrave the top surface of the strip 12' as it passes between the rollers 44 and 46. The pressure between the rollers 44 and 46 can vary from about 50 lbs. to 1000 lbs. The bottom roller 46 is preferably made of hypalon and the embossing roller 44 of steel.

A second heater 48 is provided downstream of the rollers 44 and 46 for heating the strip from below before the same is pressed between a top hard rubber roller 50 and a bottom embossing roller 52. The bottom embossing roller 52 is provided on its circumference with an embossing pattern to emboss or engrave the undersurface of the strip 12' after the same has been heated to an appropriate temperature by the heater 48. According to a preferred embodiment of the present invention, the heaters 42 and 48 each consist of an infra red heater. However, it is understood that other types of heaters could be used as well.

It is noted that the embossing rollers 44 and 52 may be water or air cooled.

The resulting embossed strip 12' is then directed to a cooling station (not shown) for stabilization before being cut and packaged.

It has been found that the definition of the embossed patterns on opposed sides of the strip 12' can be improved by prolonging the contact of the strip 12' with the embossing rollers. As illustrated with respected to the embossing station 40', this is achieved by adding appropriate guiding structures 54*a* and 54*b* immediately downstream of the embossing rollers 44' and 52'. Apart from the guiding structures 54*a* and 54*b*, the embossing station 40' is similar to the embossing station 40 and, thus, the duplicate description thereof will be omitted for brevity.

The guiding structures 54*a* and 54*b* are arranged to cause an inverse wrap around cycle about the embossing rollers 44' and 52'. More particularly, the guiding structure 54*a* is arranged to deviate the strip 12' about 80 degrees so that the same is maintained in contact with about ¼ of the circumference of the top embossing roller 44'. Likewise, the guiding structure 54*b* is arranged to deviate the strip 12' about 80 degrees so as to maintain the strip 12' in contact with about ¼ of the circumference of the bottom embossing roller 52'.

By prolonging the contact between the strip 12' and the embossing rollers 44' and 52', the definition of the pattern engraved on the opposed surfaces of the strip 12' is improved.

It is also understood that the strip 12' can be embossed on a single side thereof instead of being embossed on both sides thereof.

When the strip 12' is embossed on a single side, the lamination rollers 20 and 22 are preferably respectively made of silicon and steel. When the PVC strip 12' is embossed on both sides thereof, the lamination rollers 20 and 22 are preferably both made of silicone.

What is claimed is:

1. A method of reproducing the color of a given fabric product on a thermoplastic substrate, comprising the steps of: providing a color transfer medium, said color transfer medium being the same color transfer medium as the one used for coloring the fabric product in a stamping process, said color transfer medium including a continuous web of heat sensitive printing paper having a colorant thereon corresponding to the color of the fabric product; providing a pair of lamination rollers defining a nip therebetween; advancing a continuous thermoplastic substrate and the continuous web of heat sensitive printing paper having said colorant thereon through said nip to press said heat sensitive printing paper against a first surface of said thermoplastic substrate at a sufficiently elevated temperature to cause transfer of said colorant from said heat sensitive printing paper to said thermoplastic substrate, and separating said thermoplastic substrate from said web of heat sensitive printing paper with said thermoplastic substrate having the same color as said fabric product.

2. A method as defined in claim 1, further comprising the step of selecting a width of the web of the heat sensitive printing paper so that said width is at least greater than that of said thermoplastic substrate.

3. A method as defined in claim 2, further comprising the step of cutting the web of heat sensitive printing paper to have the selected width.

4. A method as defined in claim 1, further comprising the step of setting an angle of incidence of said web of heat sensitive printing paper so that said angle is comprised in a range extending from about 20 degrees to about 70 degrees.

5. A method as defined in claim 1, wherein said web of heat sensitive printing paper is rolled on a supply reel, and wherein the tension in the web of heat sensitive printing paper between the supply reel and the lamination rollers is controlled by adjusting an unwinding speed of the supply reel to compensate for a pulling action of the lamination rollers on the printing paper.

6. A method as defined in claim 1, further comprising the step of heating said lamination rollers to a temperature comprised in a range of about 275° F. to about 350° F.

7. A method as defined in claim 1, wherein said thermoplastic substrate is obtained by forcing a hot thermoplastic material through a die located upstream of said lamination rollers.

8. A method as defined in claim 1, further including the step of embossing a pattern on at least one surface of said thermoplastic substrate once said colorant has been transferred thereto.

9. A method as defined in claim 1, further comprising the step of advancing a second web of heat sensitive printing paper through said nip to press said second heat sensitive printing paper against a second surface of said thermoplastic substrate opposite said first surface thereof to cause transfer of colorant from said second heat sensitive printing paper to said second surface of said thermoplastic substrate.

* * * * *